US012773787B2

(12) United States Patent
Lee et al.

(10) Patent No.: US 12,773,787 B2
(45) Date of Patent: Oct. 27, 2026

(54) APPARATUS AND METHOD FOR VISION CONTROL OF WEARABLE ROBOT

(71) Applicants: Hyundai Motor Company, Seoul (KR); Kia Corporation, Seoul (KR)

(72) Inventors: Sangyun Lee, Hwaseong-Si (KR); Jaekwang Cha, Hwaseong-Si (KR)

(73) Assignee: Hyundai Motor Company ; Kia Corporation, Seoul (KR)

(*) Notice: Subject to any disclaimer, the term of this patent is extended or adjusted under 35 U.S.C. 154(b) by 47 days.

(21) Appl. No.: 18/928,441

(22) Filed: Oct. 28, 2024

(65) Prior Publication Data

US 2025/0326126 A1 Oct. 23, 2025

(30) Foreign Application Priority Data

Apr. 23, 2024 (KR) ........................ 10-2024-0053870

(51) Int. Cl.

*B25J 9/16* (2006.01)
*B25J 9/00* (2006.01)
*B25J 19/02* (2006.01)

(52) U.S. Cl.

CPC ........... *B25J 9/1697* (2013.01); *B25J 9/0006* (2013.01); *B25J 9/161* (2013.01); *B25J 19/023* (2013.01)

(58) Field of Classification Search

CPC ........ B25J 9/1697; B25J 9/0006; B25J 9/161; B25J 19/023; B25J 9/1664; B25J 13/08; A61H 3/00; A61H 2003/007; A61H 2201/165; A61H 2201/5007; G05D 1/246; G06T 5/70; G06T 7/50; G06T 2207/10028

See application file for complete search history.

(56) References Cited

U.S. PATENT DOCUMENTS

2024/0315910 A1* 9/2024 Talebi .................. A61H 1/0237

FOREIGN PATENT DOCUMENTS

CN 116872179 A * 10/2023 ............ B25J 9/0006
CN 116901036 A * 10/2023 ............ B25J 9/0006

* cited by examiner

*Primary Examiner* — Dylan M Katz
(74) *Attorney, Agent, or Firm* — Banner & Witcoff, Ltd.

(57) ABSTRACT

An apparatus of a wearable robot may comprise a transceiver configured to communicate with at least one controller of the wearable robot, at least one processor, and memory. The memory may store instructions that, when executed by the at least one processor, are configured to cause the vision control apparatus to receive, from the at least one controller of the wearable robot via a receiver of the transceiver, an indicator of a current robot foot position, detect, via a depth camera of the wearable robot, a characteristic of terrain around the wearable robot, generate, based on the detected characteristic of terrain, point cloud-based geometric information associated with the terrain, determine, based on the current robot foot position and the point cloud-based geometric information, a subsequent robot foot position, and transmit, to the at least one controller of the wearable robot via a transmitter of the transceiver, the determined subsequent robot foot position.

19 Claims, 10 Drawing Sheets

S240

S250

S260

APPARATUS AND METHOD FOR VISION CONTROL OF WEARABLE ROBOT

CROSS-REFERENCE TO RELATED APPLICATIONS

The present application claims priority to Korean Patent Application No. 10-2024-0053870, filed Apr. 23, 2024, the entire contents of which are incorporated herein by reference for all purposes.

TECHNICAL FIELD

The present disclosure relates to a vision control apparatus and method of a wearable robot, and more particularly, the present disclosure relates to a vision control apparatus and method of a wearable robot capable of immediate response to various walking environment.

BACKGROUND

If walking while wearing a robot (e.g., medical wearable robot) for medical and rehabilitation purposes, such as reconstruction of lower limb muscles or recovery of joint movement for patients or the disabled, a robot without means for environmental perception encounters difficulties in moving on stairs with steps or height variations.

Therefore, the introduction of vision control technology may be useful in helping the robot move more safely and flexibly across various terrain environments, and/or improving the user's convenience and stability in controlling the robot.

SUMMARY

The present disclosure attempts to provide a vision control apparatus and method of a wearable robot capable of perceiving a terrain environment including a flat ground, stairs, a sloped road through a camera, and calculating an arrangement path of a robot foot in response to the perceived environment and provide it to a robot.

The present disclosure attempts to provide a vision control apparatus and method of a wearable robot capable of estimating the height and normal of the terrain through a grid-type elevation map, generating geometric information thereby, and perceiving a terrain environment including a flat ground, stairs, a sloped road.

A vision control apparatus of a wearable robot may comprise: a transceiver configured to communicate with at least one controller of the wearable robot; at least one processor; and memory storing instructions that, when executed by the at least one processor, are configured to cause the vision control apparatus to: receive, from the at least one controller of the wearable robot via a receiver of the transceiver, an indicator of a current robot foot position; detect, via a depth camera of the wearable robot, a characteristic of terrain around the wearable robot; generate, based on the detected characteristic of terrain, point cloud-based geometric information associated with the terrain; determine, based on the current robot foot position and the point cloud-based geometric information, a subsequent robot foot position; and transmit, to the at least one controller of the wearable robot via a transmitter of the transceiver, the determined subsequent robot foot position.

The at least one processor may comprise a red-green-blue-depth (RGB-Depth) pre-processor configured to convert depth information of the depth camera into a point cloud form to generate the point cloud-based geometric information associated with the terrain, wherein the depth camera comprises an RGB-Depth camera.

The RGB-Depth pre-processor may be configured to perform point cloud filtering for removing noise from the converted the point cloud form and for adjusting a data size.

The apparatus may further comprise: an inertia measurement unit (IMU)-based point cloud corrector configured to align, based on one or more measurements of at least one IMU sensor, a filtered point cloud in a gravitational direction.

The instructions, when executed by the at least one processor, may be configured to cause the vision control apparatus to: set a region-of-interest; align the filtered point cloud within the region-of-interest; split the point cloud aligned within the region-of-interest into a plurality of grids; determine an elevation value for each portion of terrain corresponding to a respective grid of the plurality of grids; and generate an elevation map by combining the determined elevation values.

Each elevation value of the determined elevation values is determined based on an average of length values in the gravitational direction of point clouds, associated with the point cloud, input for the respective grid of the plurality of grids.

The instructions, when executed by the at least one processor, may be configured to cause the vision control apparatus to generate a plurality of clusters by clustering the point clouds based on a distance between the point clouds in the elevation map and a normal vector estimated for each point cloud of the point clouds.

The instructions, when executed by the at least one processor, may be configured to cause the vision control apparatus to: based on an angular difference of the normal vectors between point clouds adjacent to each other by a distance within a specific criterion being determined to be within a threshold level, classify the corresponding point clouds whose angular difference is determined to be within the threshold level into a same cluster.

The instructions, when executed by the at least one processor, may be configured to cause the vision control apparatus to extract geometric information of the terrain from the plurality of clusters, respectively.

The plurality of clusters may comprise geometric information on at least one of a flat ground, stairs, an uphill slope, or a downhill slope.

A control method of a wearable robot may comprise: receiving, from at least one controller of the wearable robot, an indicator of a current robot foot position; detecting, via a depth camera of the wearable robot, a characteristic of terrain around the wearable robot; generating, based on the detected characteristic of terrain, point cloud-based geometric information associated with the terrain; determining, based on the current robot foot position and the point cloud-based geometric information, a subsequent robot foot position; transmitting, to the at least one controller of the wearable robot, the determined subsequent robot foot position; and controlling, based on the determined subsequent robot foot position, the wearable robot.

The control method may further perform one or more operations described herein.

A vision control apparatus and method of a wearable robot according to an example may predict the robot's moving path through the geometric information of each perceived terrain and enable movement response to various environments.

A vision control apparatus and method of a wearable robot according to an example may estimate the height and normal of the terrain through a grid-type elevation map and extract geometric information (height, width, inclination of the terrain), to perceive terrain of a flat ground, stairs, a sloped road, which provides a fast processing speed and reduced error.

DETAILED DESCRIPTION

Figure 1:
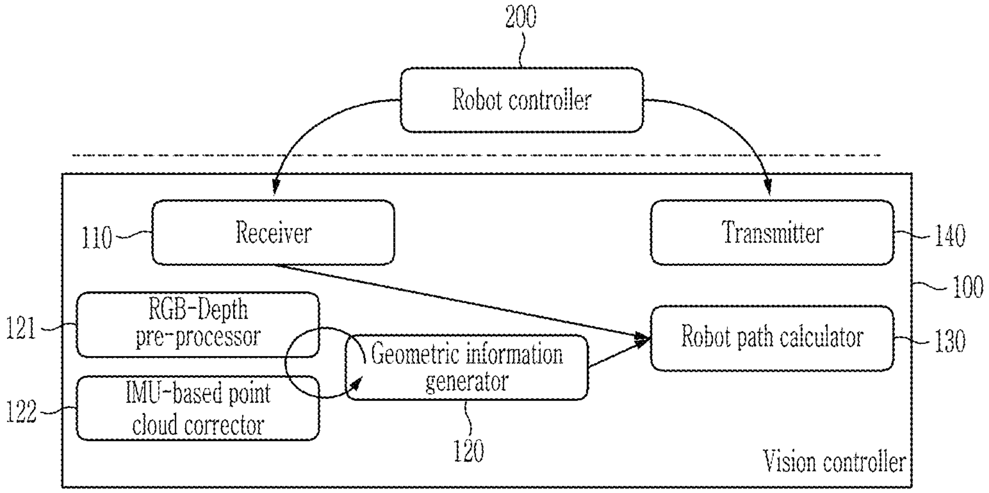
FIG. 1 schematically shows a vision control apparatus of a wearable robot according to an example and a vision system of a wearable robot including the same.

An example of the disclosure may be described more fully hereinafter with reference to the accompanying drawings such that a person skill in the art may easily implement the example. As those skilled in the art would realize, the described examples may be modified in various different ways, all without departing from the spirit or scope of the present disclosure. In order to clarify the present disclosure, parts that are not related to the description will be omitted, and the same elements or equivalents are referred to with the same reference numerals throughout the specification.

In addition, unless explicitly described to the contrary, the word “comprise” and variations such as “comprises” or “comprising” will be understood to imply the inclusion of stated elements but not the exclusion of any other elements. Terms including an ordinary number, such as first and second, are used for describing various constituent elements, but the constituent elements are not limited by the terms. The terms are only used to differentiate one component from other components.

In addition, the terms “unit”, “part” or “portion”, “-er”, and “module” in the specification refer to a unit that processes at least one function or operation, which may be implemented by hardware, software, or a combination of hardware and software.

Hereinafter, examples of the present disclosure will be described with reference to the drawings.

FIG. 1 shows a vision control apparatus of a wearable robot according to an example and a vision system of a wearable robot including the same.

A vision system of a wearable robot may be a vision system of a medical wearable robot (lower-limb wearable robot) installed with an RGB-Depth camera and an inertial measurement unit (IMU) sensor for environment perception.

For example, an RGB-Depth camera may comprise a device that captures both color images (RGB) and depth information simultaneously. It may combine the capabilities of a traditional color camera, which may capture the visual appearance of a scene using red, green, and blue channels, with a depth sensor that may measure the distance between the camera and objects in the scene. This dual data capture may enable the camera to create a 3D representation of the environment, making it useful for applications such as 3D modeling, robotics, augmented reality, and/or gesture recognition, etc. RGB-Depth camera may be useful in scenarios where understanding both the color and spatial structure of a scene may be necessary.

For example, an IMU sensor may comprise a device that may measure and/or report a body’s specific force, angular rate, and/or magnetic field, using a combination of accelerometers, gyroscopes, and/or magnetometers. The IMU sensor may track an object’s movement and orientation in 3D space, providing data on acceleration, rotation, and sometimes direction. IMUs may be useful in applications requiring precise motion tracking and stability, such as in smartphones, drones, virtual reality systems, and/or autonomous vehicles, etc. By integrating this motion data, IMUs may enable devices to navigate, stabilize, and interact with their environment more effectively.

In FIG. 1, a vision system of a wearable robot may include a vision controller 100 and a robot controller 200.

The vision controller 100 may perform an initial calibration between the robot and the sensor (e.g., IMU sensor) by using RGB image information obtained through the RGB-Depth camera, and may obtain information on the robot-surrounding environments that is refined in a point cloud form.

For example, a point cloud may comprise a collection of data points in a three-dimensional coordinate system, representing the external surface of an object or environment. Each point in the cloud may have its own set of X, Y, and Z coordinates, and/or additional information (e.g., color or intensity). Point clouds may be typically generated by 3D scanners, LiDAR, or photogrammetry techniques, and may be used in various applications such as 3D modeling, computer vision, and/or robotics, etc. They may provide a highly detailed and/or accurate representation of complex surfaces and/or structures, making them ideal for tasks like object recognition, environment mapping, and/or digital reconstruction, etc.

The vision controller 100 may estimate a height and/or a normal of the terrain through a grid-type elevation map generated by using depth information obtained through the RGB-Depth camera.

For example, a grid-type elevation map may comprise a representation of terrain or surface topography where the elevation data may be organized in a grid format. Each cell in the grid may correspond to a specific geographic location and may contain a value representing the elevation at that point. The grid structure may allow for easier processing and/or manipulation of elevation data, making it useful for tasks such as path planning, terrain analysis, and/or environmental simulations, etc.

The vision controller 100 may extract geometric information including height, width, and/or inclination of the terrain, and based on that, may perceive the walking environment such as a flat ground, stairs, and a sloped road.

The vision controller 100 may estimate a coordinate path of a robot foot by utilizing information on the walking environment perceived through the extracted geometric information. The vision controller 100 may calculate coordinates of subsequent positions of left and right robot feet of the robot in terrain of flat ground, sloped road, stairs, and the like.

For example, the vision controller 100 may use Nvidia Jetson Nano. The vision controller 100 may calculate the coordinate of the subsequent position of the robot foot (for example, a subsequent robot foot position), within 10 fps. The vision controller 100 may detect a 80 cm×80 cm region ahead, in front of a main body of the robot.

The robot controller 200 may control the movement of the robot including walking. The robot may include a wearable robot. The robot may include a medical robot. The robot may not be specifically limited, and may be any robot in various forms, types, and purposes, enabling walking.

The robot controller 200 may include a control module such as a crutch for moving the robot according to the user input.

The robot controller 200 may issue a walking command to instruct the robot to move its foot to a preset position through the control module. Here, the preset position may be received from the vision controller 100.

The robot controller 200 may send (e.g., transmit) a current status including the current position of the robot foot (for example, a current robot foot position), as well as the walking command, to the vision controller 100.

The robot controller 200 may receive the estimated coordinate path of the robot foot through the vision controller 100, and based on this, may control the robot.

A vision control apparatus 100 of a wearable robot of the present disclosure may be implemented as the vision controller 100. Hereinafter, the vision controller 100 may be referred to as the vision control apparatus 100 of a wearable robot.

The vision control apparatus 100 of a wearable robot may include a receiver 110, a geometric information generator 120, an RGB-Depth pre-processor 121, an IMU-based point cloud corrector 122, a robot path calculator 130 and/or a transmitter 140.

The receiver 110 may receive the current position of the robot foot from a robot controller 100 (see FIG. 1). The receiver 110 may receive the walking command of the robot from the robot controller 100. The walking command may include a command to provide the subsequent position of the robot foot (e.g., the subsequent robot foot position).

The geometric information generator 120 may perceive terrain through the RGB-Depth camera mounted on the robot and generate point cloud-based geometric information.

The geometric information generator 120 may generate geometric information including height, width, slope, and the like related to the perceived terrain based on point clouds.

The RGB-Depth pre-processor 121 may convert the depth information obtained from the RGB-Depth camera into the point cloud form.

The RGB-Depth pre-processor 121 may perform point cloud filtering for removing noise from the converted point cloud and adjusting a data size.

The IMU-based point cloud corrector 122 may align the filtered point cloud in a gravitational direction based on inertia measurement unit (IMU).

The geometric information generator 120 may set a Region-of-Interest, and may split the point cloud aligned within the Region-of-Interest into a plurality of grids. The Region-of-Interest may be set as an arbitrary region.

The geometric information generator 120 may calculate an elevation value with respect to terrain corresponding to each grid, and may generate the elevation map by combining the calculated elevation values.

The geometric information generator 120 may generate a grid-based elevation map. The grid may be 80 cm×80 cm.

For example, elevation value may be calculated as an average of length values (or z-axis values) in the gravitational direction of the point clouds input for each grid.

The geometric information generator 120 may generate a plurality of clusters by clustering the point clouds based on a distance between the point clouds in the elevation map and a normal vector (normal value) estimated for each point cloud.

The geometric information generator 120 may determine whether an angular difference of the normal vectors between point clouds adjacent to each other by a distance within a specific criterion is within a threshold level.

The geometric information generator 120 may classify the point clouds of which the angular difference of the normal vectors between point clouds adjacent to each other by the distance within a specific criterion is determined to be within the threshold level into the same cluster.

The geometric information generator 120 may extract the geometric information of the terrain from the plurality of clusters, respectively.

The plurality of clusters may include the geometric information of the terrain corresponding to the walking environment of one of a flat ground, stairs, an uphill slope, or a downhill slope.

The robot path calculator 130 may calculate the subsequent robot foot position based on a current robot foot position and the calculated geometric information.

The robot path calculator 130 may calculate the subsequent robot foot position through subsequent foot position planning (e.g., next-step planning) algorithm of the robot, and may update the walking information.

The transmitter 140 may send (e.g., transmit) the calculated subsequent robot foot position to the robot controller 200.

Figure 2:
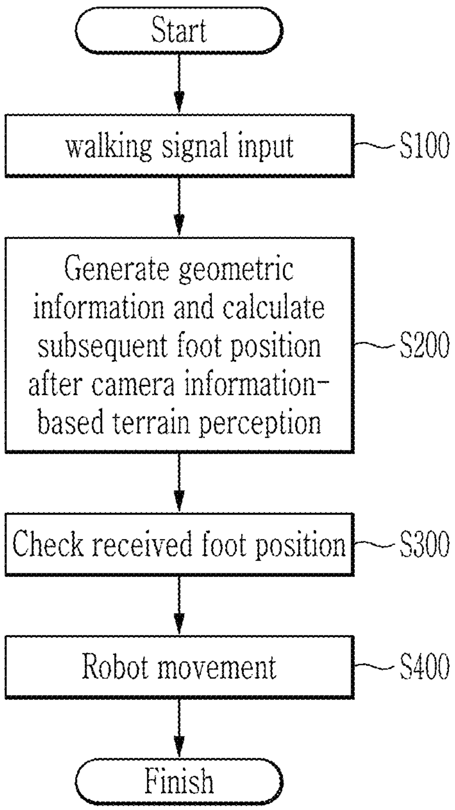
FIG. 2 and FIG. 3 show flowcharts showing a vision-based walking scenario of a robot through a vision system of a wearable robot.
Figure 3:
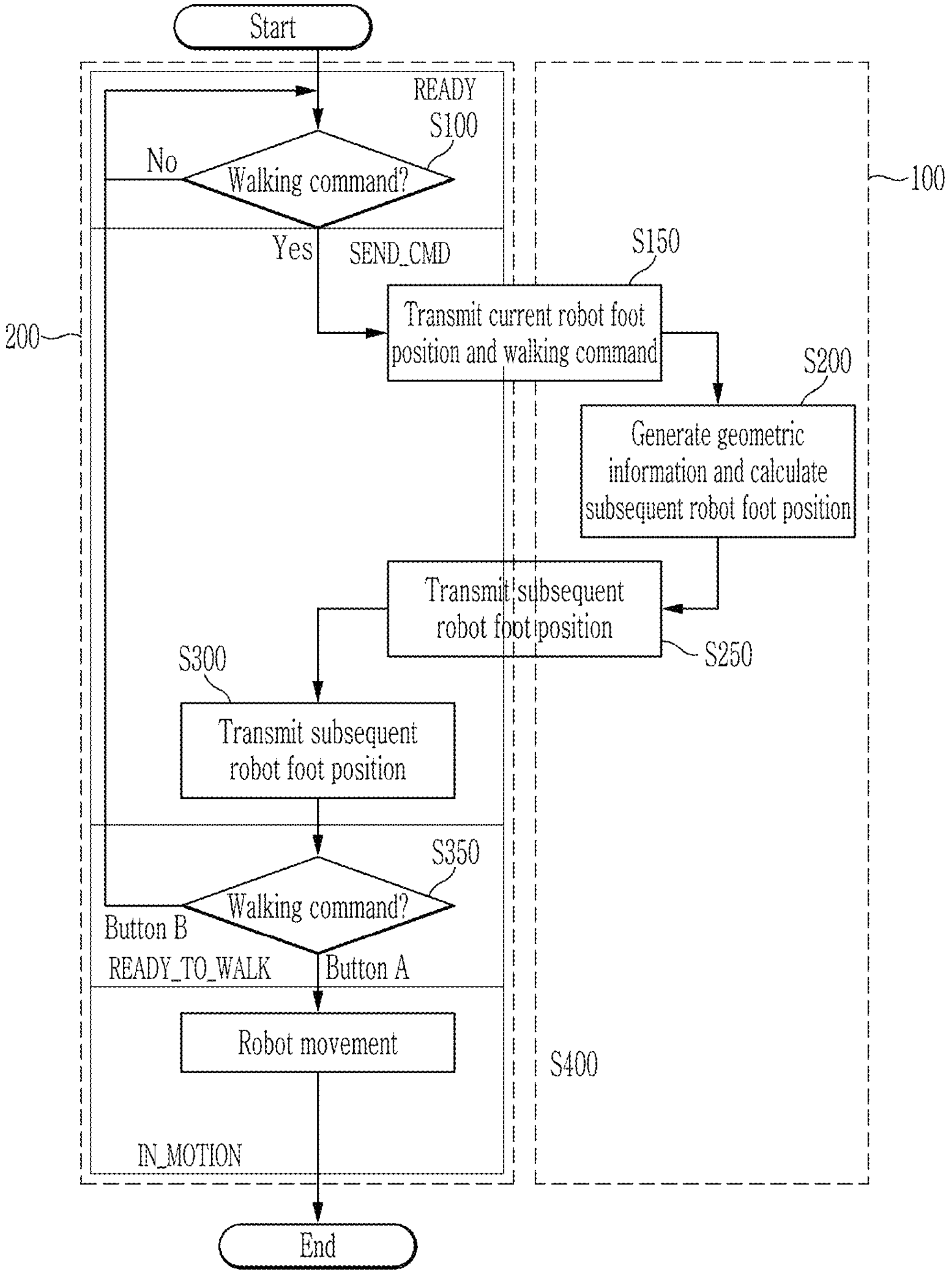

FIG. 2 and FIG. 3 show flowcharts showing a vision-based walking scenario of a robot through a vision system of a wearable robot.

FIG. 2 shows a flowchart showing a walking scenario in a vision-based walking mode of the robot.

FIG. 3 shows a flowchart showing the walking scenario of FIG. 2, more specifically. FIG. 3 discriminably shows steps performed by the vision control apparatus 100 of a wearable robot (see FIG. 1 and FIG. 2) implemented as the vision controller and by the robot controller 200 (refer to FIG. 1).

FIG. 3 may include a vision control method of a wearable robot. The vision control method of the wearable robot of FIG. 3 may be performed through the vision control apparatus 100 of a wearable robot.

At step S100, in FIG. 2 and FIG. 3, if a walking signal is input through the robot controller 200, a vision system of a wearable robot may send (e.g., transmit) the walking command to the vision control apparatus 100 of a wearable robot.

At step S150, if the user inputs a specific button on the crutch, the robot controller 200 may send (e.g., transmit) a current robot foot position information and the walking command to the vision control apparatus 100 of a wearable robot.

The vision control apparatus 100 of a wearable robot may calculate the subsequent robot foot position based on the RGB-Depth camera information. That is, at step S200, the vision control apparatus 100 of a wearable robot may perceive terrain based on the RGB information and the depth information, generate the geometric information on the terrain, and calculate the subsequent robot foot position based on the geometric information.

At step S250, the vision control apparatus 100 of a wearable robot may send (e.g., transmit) the calculated subsequent robot foot position to the robot controller 200.

The robot controller 200 may check the received subsequent robot foot position. At step S300, the robot controller 200 may output the received subsequent robot foot position to a display of the robot, such that the user may confirm it.

At step S350, the user may issue the walking command to the robot through the control module such as the crutch based on the received subsequent robot foot position.

At step S400, if the user inputs a specific button on the crutch, the robot controller 200 may move the robot foot to the subsequent robot foot position.

Figure 4:
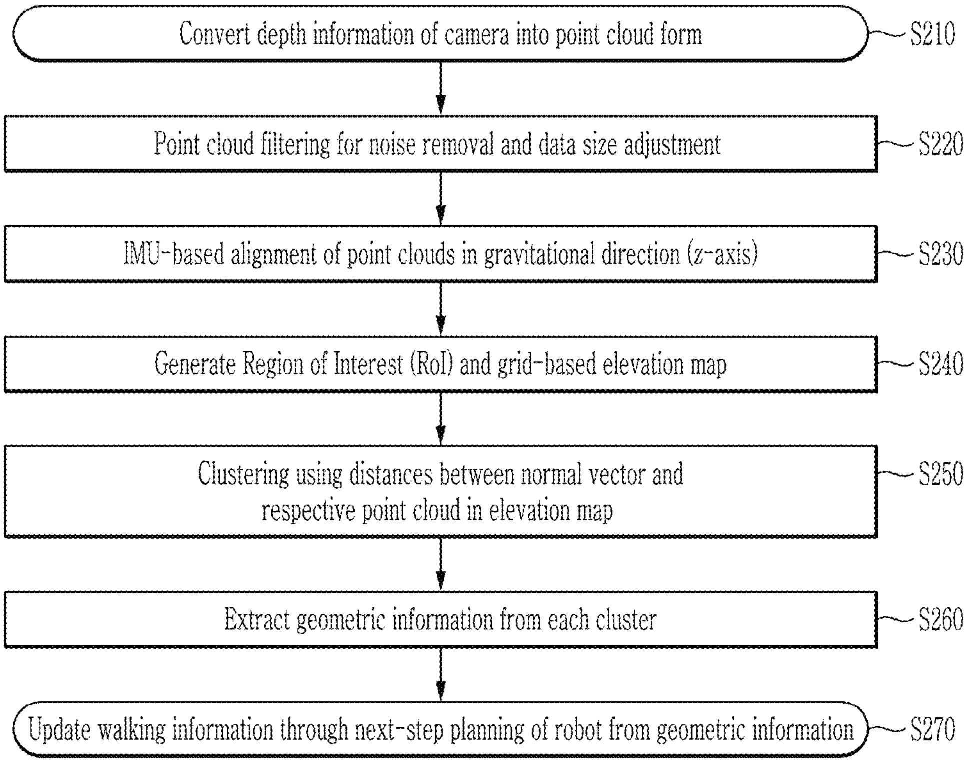
FIG. 4 shows a flowchart showing a vision control method of a wearable robot according to an example.

FIG. 4 shows a flowchart showing the vision control method of a wearable robot according to an example. FIG. 4 shows the geometric information generation step and the subsequent robot foot position calculation step of FIG. 2 and FIG. 3 according to an example.

In FIG. 4, at step S210, the vision control apparatus 100 of a wearable robot may convert the depth information of the camera into the point cloud form.

At step S220, the vision control apparatus 100 of a wearable robot may perform point cloud filtering for noise removal and/or data size adjustment.

At step S230, the vision control apparatus 100 of a wearable robot may align the point clouds along the z-axis that may be the IMU-based gravitational direction.

At step S240, the vision control apparatus 100 of a wearable robot may generate a Region of Interest (RoI) and/or a grid-based elevation map.

For example, a RoI may comprise a specific area within an image, video, or dataset that may be selected for detailed analysis or processing, for example, due to its relevance to the task at hand. The vision control apparatus 100 of a wearable robot may arbitrarily set the RoI, and may split the point cloud aligned within the Region-of-Interest into the plurality of grids.

For example, a grid-based elevation map may comprise a digital representation of terrain where the surface may be divided into a grid, with each cell in the grid containing an elevation value corresponding to the height of the terrain at that specific location. The grid-based elevation map may provide a structured way to visualize and/or analyze the topography of an area, making it useful for applications such as environmental modeling and/or robotic navigation, etc. The grid format may allow for easier computation and/or manipulation of elevation data, enabling tasks (e.g., slope analysis, watershed modeling, and/or terrain visualization, etc.).

The vision control apparatus 100 of a wearable robot may calculate the elevation value with respect to terrain corresponding to each grid. The vision control apparatus 100 of a wearable robot may generate the elevation map by combining the calculated elevation values of each grid.

The elevation values of each grid may be calculated an average of length values of the point clouds input for each grid in the z-axis of the gravitational direction.

At step S250, the vision control apparatus 100 of a wearable robot may be clustered by using a distance between the normal vector and each point cloud in the elevation map.

The vision control apparatus 100 of a wearable robot may cluster the point clouds based on the distance between the point clouds in the elevation map and the normal vector estimated for each point cloud, and generate the plurality of clusters.

The vision control apparatus 100 of a wearable robot may determine whether a distance between adjacent point clouds is within a specific criterion.

The vision control apparatus 100 of a wearable robot may determine whether the angular difference of the normal vectors between point clouds adjacent to each other by the distance within a specific criterion is within the threshold level.

The vision control apparatus 100 of a wearable robot may classify the adjacent point clouds of which the angular difference of the normal vector is determined to be within the threshold level into the same cluster.

At step S260, the vision control apparatus 100 of a wearable robot may extract the geometric information from each cluster.

The vision control apparatus 100 of a wearable robot may extract geometric information from the plurality of clusters including the geometric information on one of a flat ground, stairs, an uphill slope, or a downhill slope, respectively.

At step S270, the vision control apparatus 100 of a wearable robot may update the walking information from the geometric information, through next-step planning of the robot.

The vision control apparatus 100 of a wearable robot may perceive the walking environment based on the geometric information of the terrain, and based on that, calculate a subsequent foot position of the robot through a robot foot position calculation algorithm.

Figure 5:
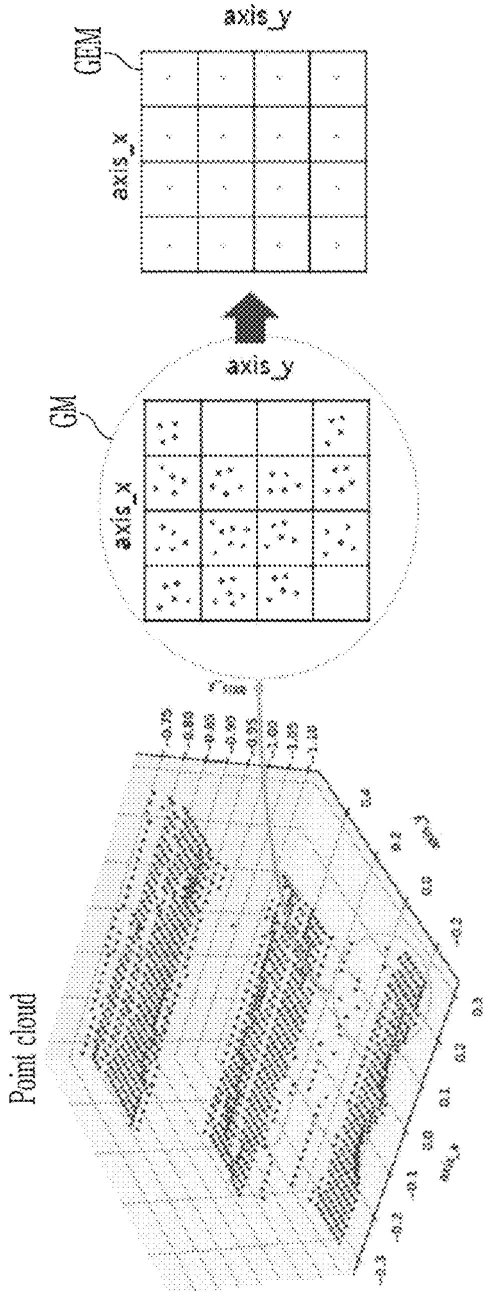
FIG. 5 shows a drawing showing the elevation map generation step of FIG. 4 according to an example.

FIG. 5 shows a drawing showing the elevation map generation step of FIG. 4 according to an example.

FIG. 5 shows the Region-of-Interest (RoI) and the point clouds falling within the Region-of-Interest and aligned along the gravitational direction (the z-axis alignment).

In FIG. 5, the vision control apparatus 100 of a wearable robot may quantize the points of the point cloud into the inside of the grid of a preset size (e.g., 80×80), and may input the length value in the z-axis to each grid to generate a grid map (GM). For example, a grid map may comprise a representation of a physical space where the area may be divided into a uniform grid of cells or squares, with each cell corresponding to a specific location in the real world. Each cell in the grid may contain data or attributes, such as whether the area is occupied, free, or has certain characteristics such as elevation or cost. The simplicity of the grid structure makes it easier to process and/or apply algorithms for movement, exploration, and mapping in both 2D and 3D environments. The grid may be 2-dimensionally represented with respect to the X-axis and the Y-axis.

The vision control apparatus 100 of a wearable robot may calculate an average value of the points input in each grid. The vision control apparatus 100 of a wearable robot may calculate the elevation value as the length value in the gravitational direction representative for each grid based on the calculated average value.

The vision control apparatus 100 of a wearable robot may calculate the average value of the heights of points for each grid, and represent it as the representative elevation value.

The vision control apparatus 100 of a wearable robot may perform the clustering based on the x, y-coordinate and the elevation value (z-value) for each grid, and generate a grid-based elevation map (GEM). For example, a GEM may comprise a digital representation of terrain where the surface may be divided into a grid, with each cell in the grid containing an elevation value corresponding to the height of the terrain at that specific location. The GEM may provide a structured way to visualize and/or analyze the topography of an area, making it useful for applications such as environmental modeling and/or robotic navigation, etc. The grid format may allow for easier computation and/or manipulation of elevation data, enabling tasks (e.g., slope analysis, watershed modeling, and/or terrain visualization, etc.).

Figure 6:
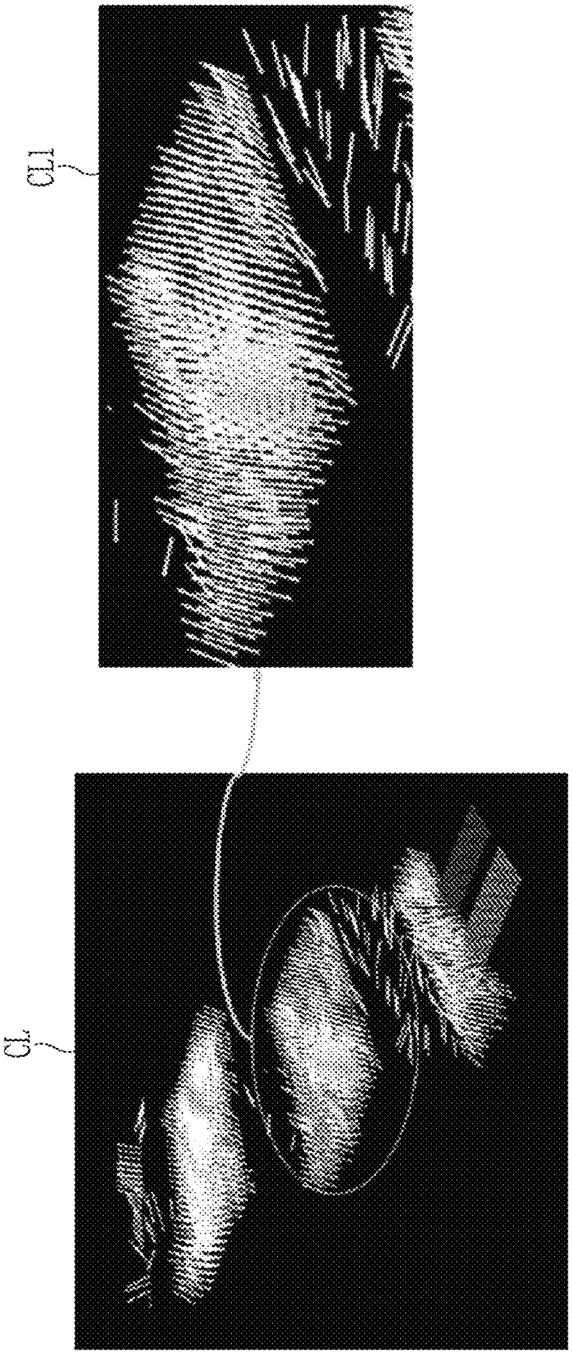
FIG. 6 shows a drawing showing the clustering step of FIG. 4 according to an example.

FIG. 6 shows a drawing showing the clustering step of FIG. 4 according to an example.

The vision control apparatus 100 of a wearable robot may perform clustering using the distance between the normal vector and each point in the elevation map.

The vision control apparatus 100 of a wearable robot may cluster the point clouds through conditional region growing clustering (CRGC).

For example, the vision control apparatus 100 of a wearable robot may determine whether the distance between point clouds lies within a specific threshold value (e.g., 1 cm).

The vision control apparatus 100 of a wearable robot may compare normal angles between point clouds, and determine whether it lies within a specific threshold angle.

If the normal becomes similar to the normal vector of the ground surface, the vision control apparatus 100 of a wearable robot may classify it as a cluster CL1.

Figure 7:
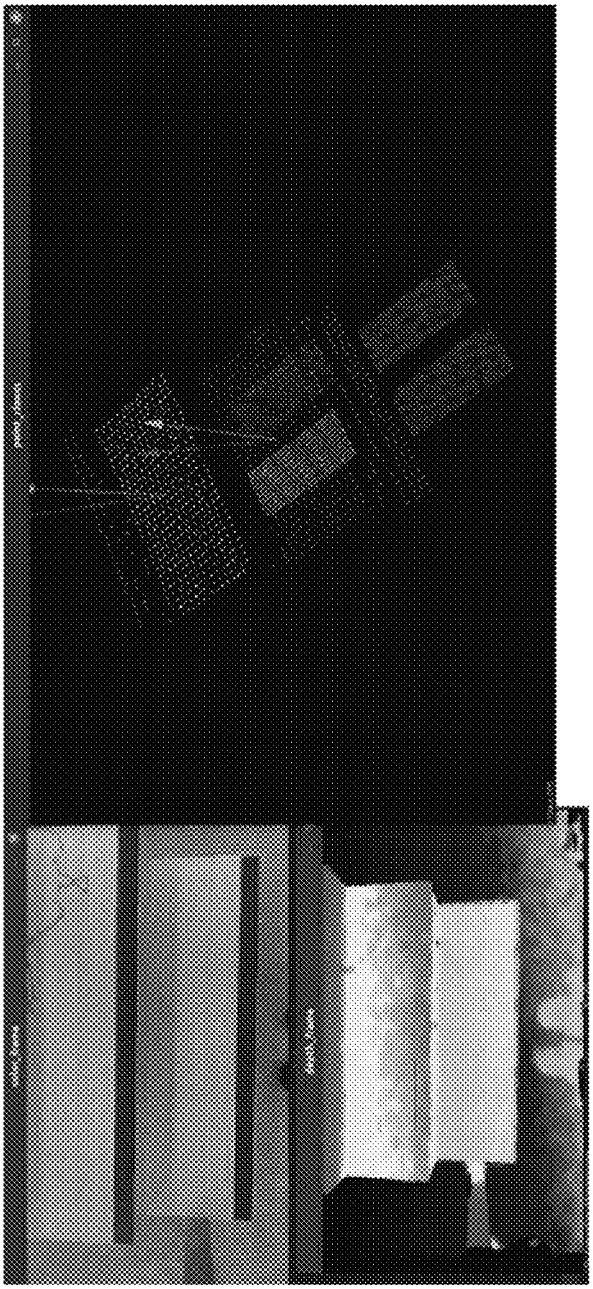
FIG. 7 shows a drawing showing the geometric information extract step of FIG. 4 according to an example.

FIG. 7 shows a drawing showing the geometric information extract step of FIG. 4 according to an example.

After the clustering (flat ground, stairs perception, or the like), the vision control apparatus 100 of a wearable robot may extract angular information by using normal information of each cluster through principal component analysis (PCA).

In FIG. 7, green arrows may correspond to the normal perpendicular to the ground surface, and red arrows may correspond to the normal estimated as a plane.

Figure 8A:
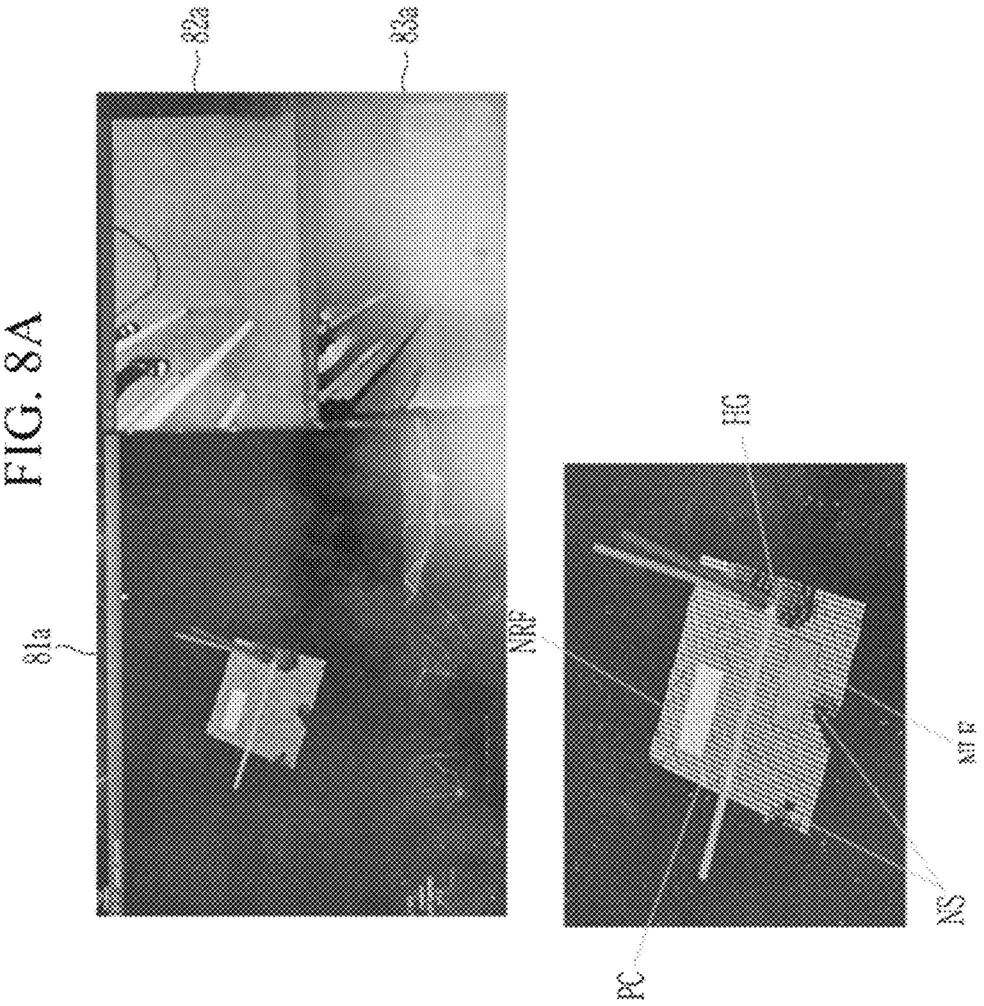
FIG. 8A and FIG. 8B shows drawings showing the result provided according to a vision control method of a wearable robot according to an example.
Figure 8B:
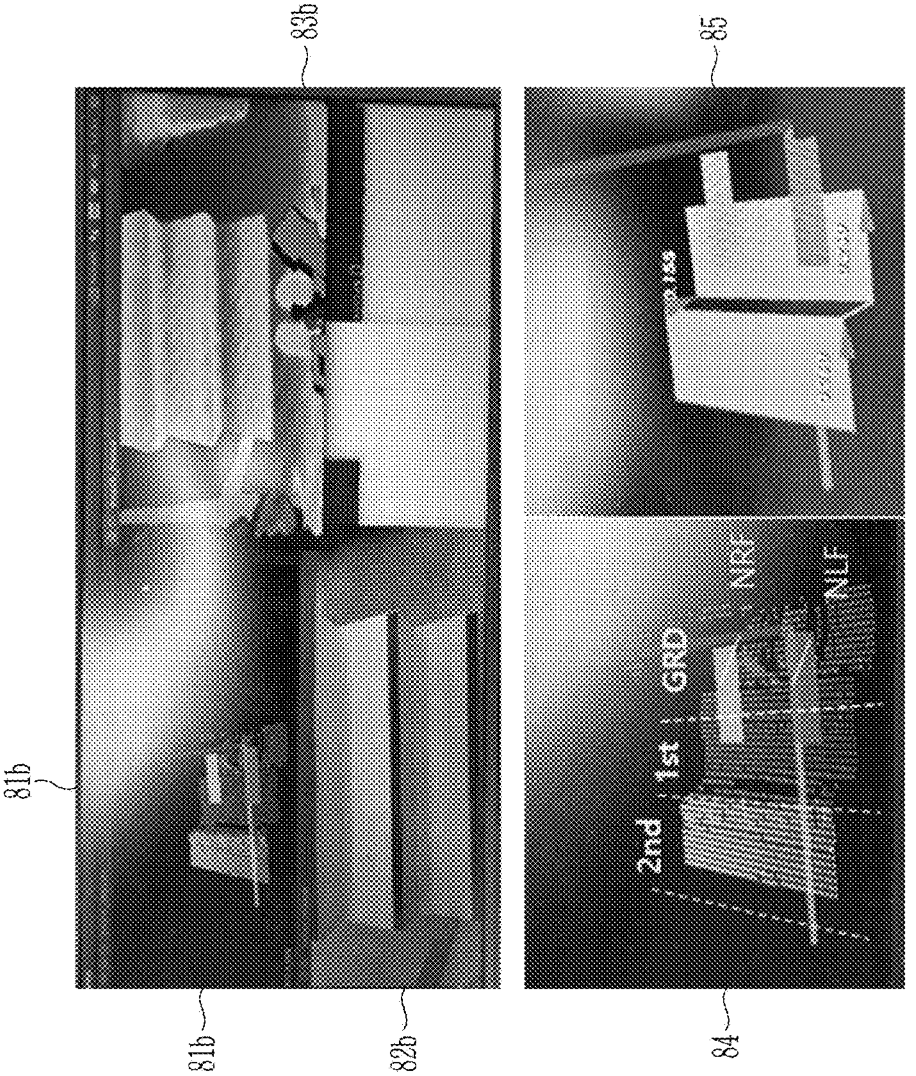

FIG. 8A and FIG. 8B show drawings showing the result provided according to the vision control method of a wearable robot according to an example.

In FIG. 8A and FIG. 8B, a vision system of a wearable robot including the vision control apparatus 100 of a wearable robot shows a robot foot position calculation results 81*a* and 81*b* of the robot predicted through a vision control method (vision algorithm) of a wearable robot, through a display.

FIG. 8A and FIG. 8B show RGB images 82*a* and 82*b* and depths 83*a* and 83*b* obtained through the RGB-Depth camera.

The robot foot position calculation result may include a point cloud PC, an identified portion (NS) other than terrain, right-foot subsequent position (NRF), left-foot subsequent position (NLF) and a cradle-identified portion (HG).

FIG. 8B shows the point cloud form 84 and a shade form 85 of the geometric information shown in the display. The geometric information of FIG. 8B represents the walking environment of stairs including the ground surface GRN, a first step 1st, a second step 2nd.

Figure 9:
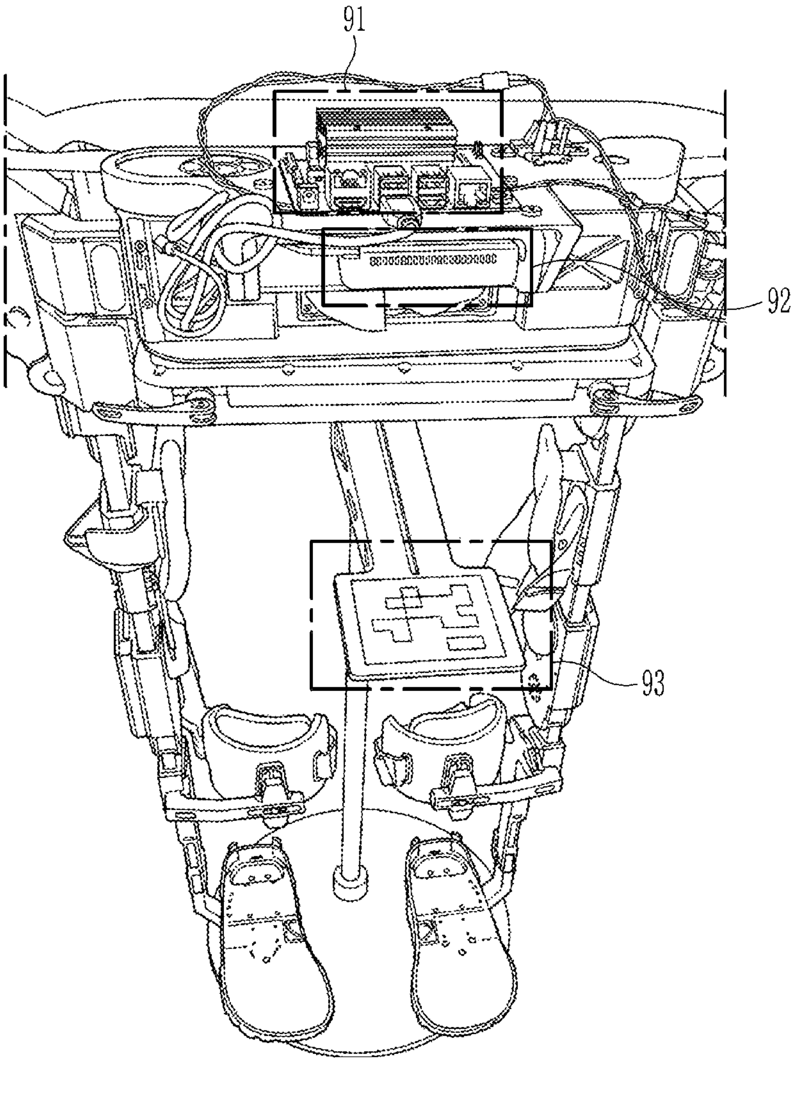
FIG. 9 shows a drawing showing a wearable robot according to an example.

FIG. 9 shows a drawing showing a wearable robot according to an example. The wearable robot may be a medical robot.

A vision controller 91 may be mounted on an area near to the chest of the medical wearable robot.

Additionally or alternatively, a camera 92 may be mounted on the area near to the chest a field-of-view (FoV) with respect to the terrain may be obtained in order to identify the moving path.

For example, a FoV may refer to the observable area that a camera, sensor, or human eye may capture at any given moment. It may be typically measured as an angle, representing the extent of the scene that may be seen horizontally, vertically, or diagonally. In the context of cameras and sensors, a wider FoV may allow more of the surroundings to be captured in a single image or scan, which may be useful to applications (e.g., photography, video recording, virtual reality, and/or autonomous navigation, etc.). The FoV may be affected by a plurality of factors such as the lens design, sensor size, and/or the distance between the observer or device and the objects being observed.

The camera 92 may include the RGB-Depth camera. The camera 92 may be mounted on a lower side of the vision controller 91.

A marker 93 comprises a marker for the initial calibration of the robot and the camera, and may be mounted to be capable of being attached and detached. The marker 93 may be used only for the initial calibration and detached as it is not used afterward.

A vision control apparatus of a wearable robot may include a receiver configured to receive a current robot foot position from the wearable robot, a geometric information generator configured to perceive terrain through an RGB-Depth camera mounted on the wearable robot and generate point cloud-based geometric information, a robot path calculator configured to calculate a subsequent robot foot position based on the current robot foot position and the geometric information, and a transmitter configured to transmit the calculated subsequent robot foot position to the wearable robot.

A vision control apparatus of a wearable robot may further include an RGB-Depth pre-processor configured to convert depth information of the RGB-Depth camera into a point cloud form.

The RGB-Depth pre-processor may be configured to perform point cloud filtering for removing noise from the converted the point cloud and adjusting a data size.

A vision control apparatus of a wearable robot may further include an IMU-based point cloud corrector configured to align a filtered point cloud in a gravitational direction based on an inertial measurement unit (IMU).

The geometric information generator may be configured to set a Region-of-Interest and split the point cloud aligned within the Region-of-Interest into a plurality of grids, and calculate an elevation value with respect to terrain corresponding to each grid and generate an elevation map by combining the calculated elevation values.

The elevation value may be calculated as an average of length values in the gravitational direction of point clouds input for each grid.

The geometric information generator may be configured to generate a plurality of clusters by clustering the point clouds based on a distance between the point clouds in the elevation map and a normal vector estimated for each point cloud.

If an angular difference of the normal vectors between point clouds adjacent to each other by a distance within a specific criterion is determined to be within a threshold level, the geometric information generator may be configured to classify the corresponding point clouds whose angular difference is determined to be within the threshold level into the same cluster.

The geometric information generator may be configured to extract geometric information of the terrain from the plurality of clusters, respectively.

The plurality of clusters may include geometric information on one of a flat ground, stairs, an uphill slope, or a downhill slope.

A vision control method of a wearable robot may include receiving a current robot foot position from the wearable robot, perceiving terrain through an RGB-Depth camera mounted on the wearable robot and generating point cloud-based geometric information, calculating a subsequent robot foot position based on the current robot foot position and the geometric information, and transmitting the calculated subsequent robot foot position to the wearable robot.

The generating the geometric information may include converting depth information of the RGB-Depth camera into a point cloud form.

The generating the geometric information may further include point cloud filtering for removing noise from the converted point cloud and adjusting a data size.

The generating the geometric information may further include aligning a filtered point cloud in a gravitational direction based on an inertia measurement unit (IMU).

The generating the geometric information may further include set a Region-of-Interest and split the point cloud aligned within the Region-of-Interest into a plurality of grids, calculate elevation values with respect to terrain corresponding to respective grids, and generate an elevation map by combining the calculated elevation values.

The elevation value may be calculated as an average of length values in the gravitational direction of point clouds input for each grid.

The generating the geometric information may include generating a plurality of clusters by clustering the point clouds based on a distance between the point clouds in the elevation map and a normal vector estimated for each point cloud.

The generating the plurality of clusters may include determining whether a distance between adjacent point clouds is within a specific criterion, determining whether an angular difference of the normal vectors between the point clouds adjacent to each other by a distance within a specific criterion is within a threshold level, and classifying the corresponding point clouds whose angular difference is determined to be within the threshold level into the same cluster.

The generating the geometric information may further include extracting a geometric information of the terrain from the plurality of clusters, respectively.

The plurality of clusters may include geometric information on one of a flat ground, stairs, an uphill slope, or a downhill slope.

While this disclosure has been described in connection with what is presently considered to be practical examples, it is to be understood that the disclosure is not limited to the disclosed examples, but, on the contrary, is intended to cover various modifications and equivalent arrangements included within the spirit and scope of the appended claims.

What is claimed is:

1. A vision control apparatus of a wearable robot, comprising:
a transceiver configured to communicate with at least one controller of the wearable robot;
at least one processor; and
memory storing instructions that, when executed by the at least one processor, are configured to cause the vision control apparatus to:
receive, from the at least one controller of the wearable robot via a receiver of the transceiver, an indicator of a current robot foot position;
detect, via a depth camera of the wearable robot, a characteristic of terrain around the wearable robot;
generate, based on the detected characteristic of terrain, point cloud-based geometric information associated with the terrain;
determine, based on the current robot foot position and the point cloud-based geometric information, a subsequent robot foot position; and
transmit, to the at least one controller of the wearable robot via a transmitter of the transceiver, the determined subsequent robot foot position,
wherein the instructions, when executed by the at least one processor, are configured to cause the vision control apparatus to, based on an angular difference of normal vectors between point clouds adjacent to each other by a distance within a specific criterion being determined to be within a threshold level, classify the corresponding point clouds whose angular difference is determined to be within the threshold level into a same cluster.

2. The vision control apparatus of claim 1, wherein the at least one processor comprises a red-green-blue-depth (RGB-Depth) pre-processor configured to convert depth information of the depth camera into a point cloud form to generate the point cloud-based geometric information associated with the terrain, wherein the depth camera comprises an RGB-Depth camera.

3. The vision control apparatus of claim 2, wherein the RGB-Depth pre-processor is configured to perform point cloud filtering for removing noise from the converted the point cloud form and for adjusting a data size.

4. The vision control apparatus of claim 3, further comprising:
an inertia measurement unit (IMU)-based point cloud corrector configured to align, based on one or more measurements of at least one IMU sensor, a filtered point cloud in a gravitational direction.

5. The vision control apparatus of claim 4, wherein the instructions, when executed by the at least one processor, are configured to cause the vision control apparatus to:
set a region-of-interest;
align the filtered point cloud within the region-of-interest;
split the point cloud aligned within the region-of-interest into a plurality of grids;
determine an elevation value for each portion of terrain corresponding to a respective grid of the plurality of grids; and
generate an elevation map by combining the determined elevation values.

6. The vision control apparatus of claim 5, wherein each elevation value of the determined elevation values is determined based on an average of length values in the gravitational direction of point clouds, associated with the point cloud, input for the respective grid of the plurality of grids.

7. The vision control apparatus of claim 5, wherein the instructions, when executed by the at least one processor, are configured to cause the vision control apparatus to generate a plurality of clusters by clustering the point clouds based on a distance between the point clouds in the elevation map and a normal vector estimated for each point cloud of the point clouds.

8. The vision control apparatus of claim 7, wherein the instructions, when executed by the at least one processor, are configured to cause the vision control apparatus to extract geometric information of the terrain from the plurality of clusters, respectively.

9. The vision control apparatus of claim 8, wherein the plurality of clusters comprise geometric information on at least one of a flat ground, stairs, an uphill slope, or a downhill slope.

10. A control method of a wearable robot, the control method comprising:

receiving, from at least one controller of the wearable robot, an indicator of a current robot foot position;

detecting, via a depth camera of the wearable robot, a characteristic of terrain around the wearable robot;

generating, based on the detected characteristic of terrain, point cloud-based geometric information associated with the terrain;

determining, based on the current robot foot position and the point cloud-based geometric information, a subsequent robot foot position;

transmitting, to the at least one controller of the wearable robot, the determined subsequent robot foot position; and controlling, based on the determined subsequent robot foot position, the wearable robot, wherein the generating the point cloud-based geometric information comprises generating a plurality of clusters by clustering point clouds based on a distance between the point clouds and a normal vector estimated for each point cloud of the point clouds, wherein the generating the plurality of clusters comprises:

determining that a distance between adjacent point clouds is within a specific criterion;

determining whether an angular difference of the normal vectors between the adjacent point clouds is within a threshold level; and classifying the corresponding point clouds whose angular difference is determined to be within the threshold level into a same cluster.

11. The control method of claim 10, wherein the generating the point cloud-based geometric information comprises converting depth information of a red-green-blue-depth (RGB-Depth) camera into a point cloud form, wherein the depth camera comprises an RGB-Depth camera.

12. The control method of claim 11, wherein the generating the point cloud-based geometric information further comprises point cloud filtering for removing noise from the converted point cloud form and for adjusting a data size.

13. The control method of claim 12, wherein the generating the point cloud-based geometric information further comprises aligning, based on one or more measurements of at least one inertia measurement unit (IMU) sensor, a filtered point cloud in a gravitational direction.

14. The control method of claim 13, wherein the generating the point cloud-based geometric information further comprises:

setting a region-of-interest;

splitting the aligned filtered point cloud that is aligned within the region-of-interest into a plurality of grids;

determining an elevation value for each portion of terrain corresponding to a respective gird of the plurality of grids; and generating an elevation map by combining the determined elevation values.

15. The control method of claim 14, wherein each elevation value of the determined elevation values is determined based on an average of length values in the gravitational direction of point clouds, associated with the point cloud, input for the respective grid of the plurality of grids.

16. The control method of claim 10, wherein the generating the point cloud-based geometric information further comprises extracting a geometric information of the terrain from the plurality of clusters, respectively.

17. The control method of claim 16, wherein the plurality of clusters comprise geometric information on at least one of a flat ground, stairs, an uphill slope, or a downhill slope.

18. The control method of claim 10, wherein the generating the plurality of clusters comprises applying conditional region growing clustering (CRGC) by determining whether a distance between the point clouds is within a specific distance threshold, determining whether a normal angle between the point clouds is within a specific threshold angle, and classifying a point cloud whose normal becomes similar to a normal vector of a ground surface into a corresponding cluster.

19. The vision control apparatus of claim 7, wherein the instructions, when executed by the at least one processor, are configured to cause the vision control apparatus to generate the plurality of clusters by conditional region growing clustering (CRGC) in which the vision control apparatus determines whether a distance between the point clouds is within a specific distance threshold and whether a normal angle between the point clouds is within a specific threshold angle, and classifies a point cloud whose normal becomes similar to a normal vector of a ground surface into a corresponding cluster.

* * * * *